W. F. RUNDELL.
Hay-Fork.

No. 60,065.  Patented Nov. 27, 1866.

Witnesses:

Inventor:

United States Patent Office.

IMPROVEMENT IN HAY FORKS.

WILLIAM F. RUNDELL, OF GENOA, NEW YORK.

Letters Patent No. 60,065, dated November 27, 1866.

SPECIFICATION.

TO ALL WHOM IT MAY CONCERN:

Be it known that I, WILLIAM F. RUNDELL, of Genoa, in the county of Cayuga, and State of New York, have invented a new and improved Hay Fork; and I do hereby declare that the following is a full, clear, and exact description thereof, which will enable those skilled in the art to make and use the same, reference being had to the accompanying drawings, forming part of this specification, in which—

Figure 1:
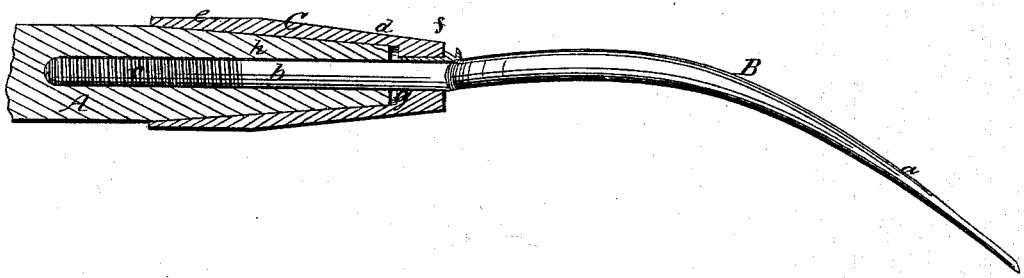
Figure 2:
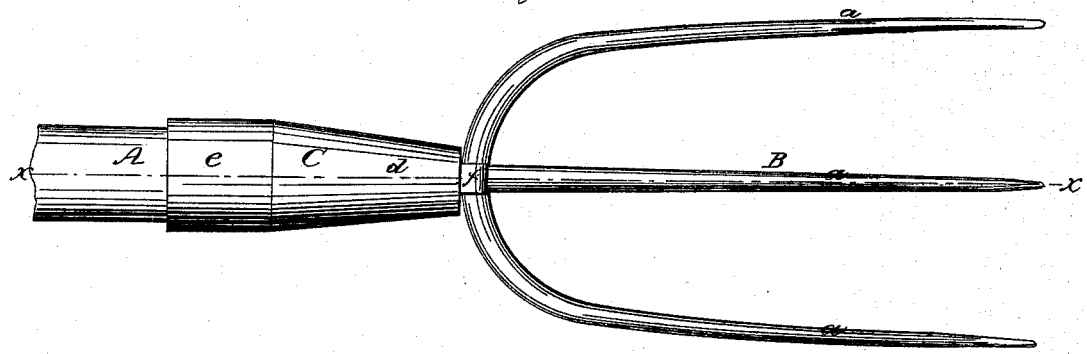

Figure 1 is a side sectional view of my invention, taken in the line $x\ x$, fig. 2.

Figure 2, a front or face view of the same.

Similar letters of reference indicate corresponding parts.

This invention relates to a new and useful improvement on a hay fork, for which Letters Patent were granted to me bearing date March 28th, 1865. The present invention and improvement consist in a modification of the ferrule, as hereinafter fully shown and described, whereby the strength and durability of the fork are very materially increased. The handles of hay forks being invariably constructed of wood, and tapered at the end in which the tang of the fork is fitted, are very liable to split and break at the said end, as that is the point where they are subjected to the greatest strain. The present invention, it is believed, fully obviates the difficulty of breakage at the point specified; and it consists in having the ferrule constructed with its inner portion of cylindrical form, and the outer part of conical form, the cylindrical portion extending over for a suitable distance the cylindrical portion of the handle, while the conical portion receives the taper end of the same, so that the end of the handle will have the whole surface of the end of the grain of the wood covered and the splitting of the same avoided, the ferrule lapping over the handle and not being let into it, so as to be "flush" at its inner end with the same.

A represents a portion of the wooden handle of the fork, and B the fork, which, in this instance, is constructed with three tines, $a\ a\ a$, and a tang, $b$, the latter having a screw-thread, $c$, cut or formed upon it, so that it may screw into the handle, A, as shown clearly in fig. 1. C represents a ferrule, which may be of wrought or cast metal, and has its outer part, $d$, of conical form, and its inner part, $e$, of cylindrical form, as shown in both figures, an aperture being made or allowed in the outer end of the ferrule to admit of the tang, $b$, passing through into the handle, A, and also to admit of a key, $f$, being driven in, to prevent the tang, $b$, or handle and ferrule, from turning after the tang is adjusted in the handle. (See fig. 1.) The end of the handle is tapered to correspond to the conical portion of the ferrule, so that it may fit snugly therein, the handle not being tapered so much as to allow its end to come in contact with the end of the ferrule at first, a space, $g$, being allowed to admit of the ferrule being driven further on the handle in case of the shrinking of the latter. The cylindrical part, $e$, of the ferrule laps or fits over the cylindrical part of the handle some distance beyond the commencement of the taper part of the handle, and the ferrule is not let into the handle, as that would weaken the latter. By this arrangement the end of the grain of the wood is fully covered and prevented from splitting or separating, a contingency very liable to occur were the ferrule to terminate with the conical part, $d$, as the grain would not be protected at the point, $h$, where the handle is subjected to a great strain when the fork is in use. The screw tang, a conical ferrule, and a key for preventing the tang from casually turning, have been previously used, and may be seen in the hay fork formerly patented by me and previously alluded to; but the constructing of the ferrule with a conical and cylindrical portion, as herein shown and described, is, so far as I am aware, new, and fully obviates the liability of breakage or the parting or splitting of the grain of the wood at the end of the handle in which the screw tang is fitted.

I do not claim, therefore, broadly, a conical ferrule, screw tang, and key, but I do claim as new, and desire to secure by Letters Patent—

The ferrule C, constructed with a conical part $d$, and a cylindrical part $e$, in combination with the screw tang $b$ of the fork B, the key $f$, and the handle A, to form a new and improved hay fork, substantially as set forth.

WILLIAM F. RUNDELL.

Witnesses:
S. S. HEWITT,
R. J. HEWITT.